US009178680B2

(12) United States Patent
Zhang et al.

(10) Patent No.: US 9,178,680 B2
(45) Date of Patent: Nov. 3, 2015

(54) CONTROL SIGNALING FOR DOWNLINK COORDINATED MULTIPOINT WIRELESS COMMUNICATION

(75) Inventors: Min Zhang, Swindon Wilts (GB); Matthew P. J. Baker, Canterbury (GB); Fang-Chen Cheng, Randolph, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/428,503

(22) Filed: Mar. 23, 2012

(65) Prior Publication Data
US 2013/0250864 A1 Sep. 26, 2013

(51) Int. Cl.
H04W 72/04 (2009.01)
H04L 5/00 (2006.01)
H04B 7/02 (2006.01)

(52) U.S. Cl.
CPC ............ H04L 5/0092 (2013.01); H04L 5/0035 (2013.01); H04W 72/042 (2013.01); H04B 7/024 (2013.01); H04L 5/0007 (2013.01); H04L 5/0044 (2013.01); H04W 72/0426 (2013.01)

(58) Field of Classification Search
CPC ....... H04W 8/00; H04W 72/04; H04W 24/00; H04W 72/0426; H04W 72/042; H04B 7/212; H04B 7/024; H04L 5/0092; H04L 5/0035; H04L 5/0007; H04L 5/0044
USPC .......... 370/328, 329, 331, 349; 455/434, 509, 455/517, 561
See application file for complete search history.

(56) References Cited

U.S. PATENT DOCUMENTS

| 8,442,566 | B2 * | 5/2013 | Liu et al. | 455/509 |
|---|---|---|---|---|
| 8,599,711 | B2 * | 12/2013 | Hugl et al. | 370/252 |
| 8,605,668 | B2 * | 12/2013 | Kubota et al. | 370/329 |
| 2002/0131381 | A1 * | 9/2002 | Kim et al. | 370/335 |
| 2011/0188428 | A1 * | 8/2011 | Ishii | 370/311 |
| 2011/0199986 | A1 * | 8/2011 | Fong et al. | 370/329 |
| 2011/0243100 | A1 * | 10/2011 | Ball et al. | 370/335 |
| 2012/0063386 | A1 * | 3/2012 | Park et al. | 370/315 |
| 2012/0094664 | A1 * | 4/2012 | Jung et al. | 455/434 |
| 2012/0176884 | A1 * | 7/2012 | Zhang et al. | 370/203 |
| 2013/0039291 | A1 * | 2/2013 | Blankenship et al. | 370/329 |
| 2013/0114431 | A1 * | 5/2013 | Koivisto | 370/252 |

OTHER PUBLICATIONS

*Overview of the 3GPP Long Term. Evolution Physical Layer.* Jim Zyren jzyren@freescale.com. Dr. Wes McCoy, Technical Editor, Jul. 2007 pp. 1-25.

(Continued)

*Primary Examiner* — Chandrahas Patel
*Assistant Examiner* — Lan Huong Truong
(74) *Attorney, Agent, or Firm* — Davidson Sheehan LLP (57) ABSTRACT

Embodiments of the claimed subject matter provide a method and apparatus coordinating downlink multipoint transmissions. One embodiment of the method includes transmitting, from a first base station, first information indicating a first constraint on a starting position for downlink data transmission by the first base station or one or more second base stations. This embodiment of the method also includes transmitting, from the first base station, second information that includes a bit. A combination of the bit and the first information indicates the starting position for the downlink data transmission.

22 Claims, 6 Drawing Sheets

(56) References Cited

OTHER PUBLICATIONS

*Centralized Scheduling for Joint Transmission Coordinated Multi-Point in LTE-Advanced*, Stefan Brueck, Lu Zhao, Jochen Giese and M. Awais Amin , Qualcomm CDMA Technologies Nordostpark 89, 90411, Nuremberg, Germany{sbrueck, luz, jgiese, mamin}169 qualcomm.com; 2010 International ITG Workshop on Smar Antennas (WSA 2010).

International Search Report and Written Opinion, PCT/US2013/027844, dated Jun. 20, 2013, 11 pages.

Panasonic, "DCI for Rel-11 CoMP Operations," 3rd Generation Partnership Project, vol. RAN WG1, No. 68bis, Jeju, Korea, Mar. 26-30, 2012.

HTC, "Indication of Starting Symbol in PDSCH in a Cross-Scheduled Carrier," 3rd Generation Partnership Project, vol. RAN WG1, No. 61, Montreal, Canada, May 10-14, 2010.

Alcatel-Lucent et al., "Remaining Issues of Downlink Control Signaling for CoMP", 3rd Generation Partnership Project, vol. RAN WG1, No. 70, Qingdao, China, Aug. 13-17, 2012.

Renesas Mobile Europe Ltd., "Downlink Control Signaling for CoMP", 3rd Generation Partnership Project, vol. RAN WG1, No. 67, San Francisco, USA, Nov. 14-18, 2011.

\* cited by examiner

CONTROL SIGNALING FOR DOWNLINK COORDINATED MULTIPOINT WIRELESS COMMUNICATION

BACKGROUND

This application relates generally to communication systems, and, more particularly, to wireless communication systems.

Wireless communication systems provide wireless connectivity to access terminals using a network of interconnected access nodes or base stations. Communication over the air interface between the access terminals and the base stations takes place according to various agreed-upon standards and/or protocols. For example, the Third Generation Partnership Project (3GPP, 3GPP2) has specified a set of standards for a packet-switched wireless communication system referred to as Long Term Evolution (LTE). The LTE standards support downlink transmission using orthogonal frequency division multiplexing (OFDM). Access terminals (such as base stations or eNodeBs) can concurrently communicate with multiple users over control and data channels formed by allocating symbols in different sets of non-overlapping Fourier-coefficients or sub-carriers. The LTE standards also support multiple-input/multiple-output (MIMO) communication over the air interface using multiple antennas deployed at transmitters and/or receivers. The carrier bandwidth supported by LTE is approximately 20 MHz, which can support a downlink peak data rate of approximately 100 Mbps and a peak data rate of the uplink of approximately 50 Mbps.

The LTE standards also support coordinated multipoint (CoMP) transmission techniques including dynamic point selection (DPS) or joint transmission (JT). Coordinated multipoint transmissions for user equipment are coordinated by the serving cell for the user equipment using information communicated between the serving cell and other neighboring cells that are participating in the coordinated transmission. The serving cell can then schedule downlink transmissions to user equipment, e.g., based on channel conditions between the user equipment, the serving cell, and the neighboring cells. In dynamic point selection, the serving cell can schedule transmissions by the neighboring cells for different subframes one cell at a time. In joint transmission, the serving cell schedules concurrent transmissions by multiple cells, which may or may not include the serving cell.

SUMMARY OF EMBODIMENTS

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for coordinating downlink multipoint transmissions. One embodiment of the method includes transmitting, from a first base station, first information indicating a first constraint on a starting position for downlink data transmission by the first base station or one or more second base stations. This embodiment of the method also includes transmitting, from the first base station, second information that includes a bit. A combination of the bit and the first information indicates the starting position for the downlink data transmission.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It will thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

Base stations implemented in communication systems that operate according to standards and/or protocols that use orthogonal frequency division multiplexing (OFDM) typically have a frame structure that reserves some symbols for control channel signaling. For example, the LTE or LTE-Advanced standards define a subframe structure that may include seven time intervals (e.g., symbols) and numerous subcarriers. Each resource element in the subframe corresponds to one time interval on one subcarrier. Base stations that implement the LTE or LTE-Advanced standards may reserve the resource elements for as many as three symbols for control channel signaling. The reserved symbols are typically the first symbols in the subframe and data traffic is constrained to use the symbols following the reserved symbols in the subframe. Neighboring base stations are not constrained to reserve the same set of symbols for transmission of their control channels.

Coordinated multipoint (CoMP) techniques can be used to schedule data transmission by multiple base stations in the same resource elements, e.g., for joint transmission. However, collisions between data and control traffic may occur when neighboring base stations use different numbers of reserved symbols for control signaling. For example, the serving base station may schedule data transmissions beginning at the second symbol if the serving base station only reserves the first symbol for control signaling. The scheduled data transmissions may collide with control signaling by neighbor base stations that reserve the second symbol for control signaling. For expected LTE CoMP scenarios that coordinate base stations having different cell identifiers, the conflict among transmission points due to different starting points for the physical downlink shared channel (PDSCH) is unavoidable since the PDSCH starting points are independently scheduled by individual cells.

Joint transmission can be restricted to base stations that share the same starting points for their data channels. However, this restriction would significantly constrain implementations of CoMP and may also significantly reduce the potential gain that can be achieved using joint transmission in a dynamic environment by reducing the number of base stations and symbols that are available for joint transmission. Another approach is to constrain joint transmission to symbols that are available to all of the base stations that are cooperating in the joint transmission. The starting point for the data transmission may then be signaled semi-statically (e.g., every 10-20 ms) using higher layer signaling such as radio resource control (RRC) layer signaling. In this approach, resource elements that may be available for data transmission in some base stations, but which conflict with reserved symbols in other base stations, are bypassed. Consequently, limitations on the available resource elements imposed by this approach reduce the potential gain that may be achieved using joint transmission. Another alternative is to transmit several (e.g., 3) bits of downlink control information (DCI) in every subframe to indicate starting points for each of the base stations. This approach would unnecessarily consume significant overhead because the number of symbols reserved for control signaling in each base station is not typically expected to vary on the relatively short timescales corresponding to individual subframes.

At least in part to address these drawbacks, the present application describes embodiments of techniques that use a combination of a first and a second indicator to signal a data channel characteristic such as a starting time for the data channel or a data channel transmission point identifier. In one embodiment, the first indicator may be a bit (such as an additional bit added to the DCI) that is signaled on a control channel in the same subframe as the data channel. The first indicator may therefore be transmitted on a relatively short time scale, e.g., in every subframe or once for a selected number of subframes. In one embodiment, the second indicator may be transmitted using higher layer signaling such as RRC layer signaling. The second indicator may therefore be transmitted on a relatively long time scale, e.g., once every 10-20 ms. Combining a first indicator that can be transmitted on a short timescale with a second indicator that can be transmitted on a relatively long time scale may allow the system to balance the ability to dynamically signal changes on a subframe-by-subframe basis with a reduction in the total amount of subframe overhead consumed by the downlink CoMP signaling.

Figure 1:
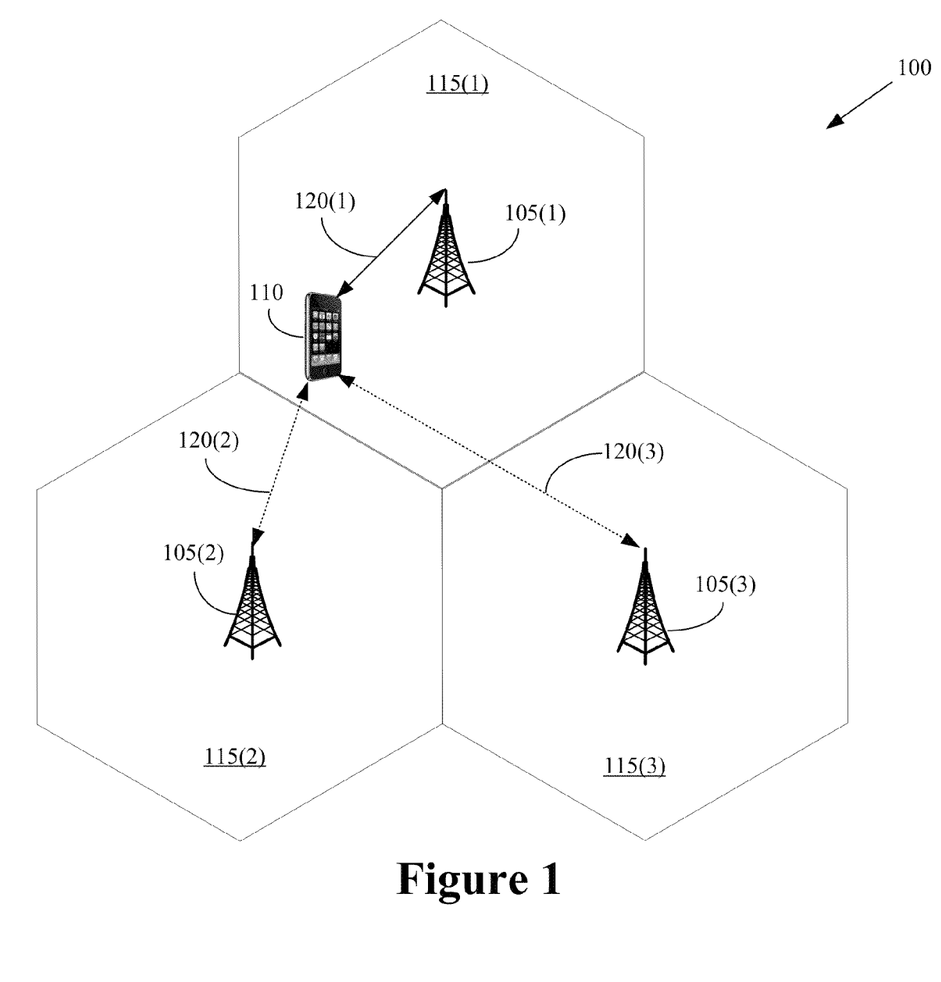
FIG. 1 conceptually illustrates a first exemplary embodiment of a wireless communication system.

FIG. 1 conceptually illustrates a first exemplary embodiment of a wireless communication system 100. The wireless communication system 100 includes base stations 105 that provide wireless connectivity to user equipment 110 located in associated cells 115. As used herein, the term "base station" refers to the hardware, firmware, or software used to generate, transmit, receive, decode, demodulate, or perform other operations associated with signals transmitted over the air interface. The term "cell" refers to the geographic area served by a base station. The term "sector" may be used to refer to subsets of the geographic area served by the base station, e.g., portions of the geographic area that are served by different sets of antennas that are physically, electromagnetically, or communicatively coupled to the base station. The terms "cell" and "sector" may therefore be synonymous and refer to the same geographic area or a cell may be divided into multiple sectors. Base stations 105 or their associated cells 115 may be identified using a cell identifier and each base station 105 may transmit a common reference signal in to the associated cell 115. In some embodiments, sectors may be identified by a sector-specific reference signal such as a channel state information-reference signal (CSI-RS) that is transmitted into the sector. The term "transmission point" may refer to a base station, a cell, or a sector, depending on the context in which this term is used.

In the illustrated embodiment, the wireless communication system 100 operates according to the LTE standards and/or protocols agreed upon by the Third Generation Partnership Project (3GPP). For example, the wireless communication system 100 supports orthogonal frequency division multiplexing (OFDM) of downlink transmissions. An OFDM system divides the available bandwidth into a plurality of narrowband subcarriers that are used to transmit symbols over the air interface such as the air interfaces 120 between the base stations 105 and user equipment 110. Each subcarrier may be modulated using varying levels of QAM modulation, e.g. QPSK, QAM, 64QAM or possibly higher orders depending on signal quality. In one embodiment, the available bandwidth supports one or more component carriers. For example, a downlink component carrier may be used for communication over the air interfaces 120. The downlink component carrier may temporally divided into frames that are further temporally subdivided into subframes. Each subframe includes two timeslots.

Figure 2:
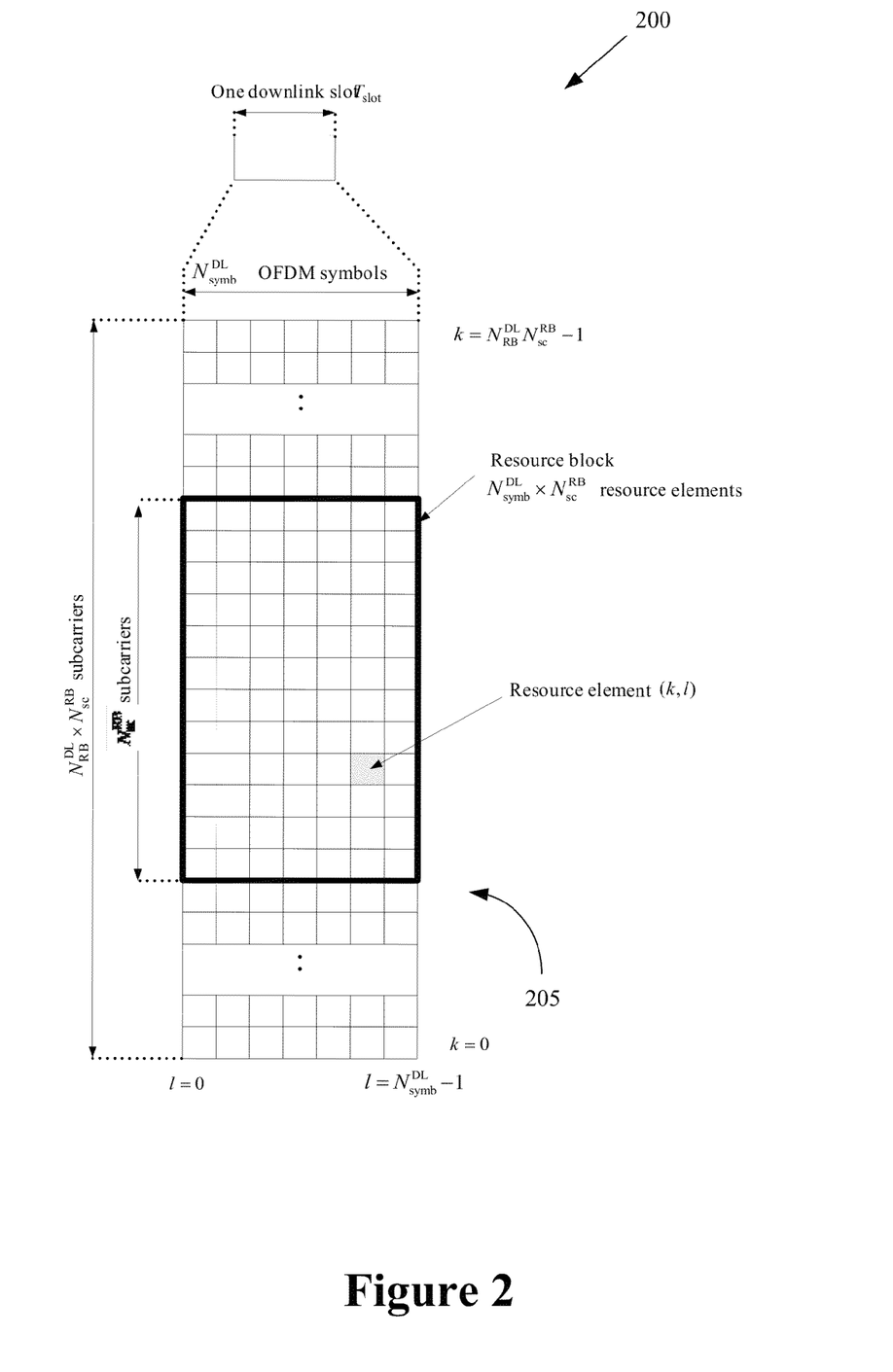
FIG. 2 depicts one exemplary downlink time slot, $T_{slot}$, of a downlink component carrier.

FIG. 2 depicts one exemplary downlink time slot, $T_{slot}$, of a downlink component carrier 200. The transmitted signal in each slot is described by one or several resource grids 205 of $N_{RB}^{DL} N_{sc}^{RB}$ subcarriers and $N_{symb}^{DL}$ symbols. The quantity $N_{RB}^{DL}$ depends on the downlink transmission bandwidth configured in the cell and in embodiments that conform to the 3GPP standards, the quantity fulfills the condition:

$$N_{RB}^{min,DL} \leq N_{RB}^{DL} \leq N_{RB}^{max,DL}$$

where $N_{RB}^{min,DL}=6$ and $N_{RB}^{max,DL}=110$ are the smallest and largest downlink bandwidths, respectively, supported by the current version of the specification. The number of OFDM symbols in a slot may depend on the cyclic prefix length configured by a higher layer parameter DL-CyclicPrefix-Length.

Each element in the resource grid 205 may be referred to as a resource element and can be uniquely defined by the index pair (k,l) in a slot where k=0, . . . , $N_{RB}^{DL}N_{sc}^{RB}-1$ and l=0, . . . , $N_{symb}^{DL}-1$ are the indices in the frequency and time domains, respectively. Resource element (k,l) on antenna port p corresponds to the complex value $a_{k,l}^{(p)}$. When there is no risk for confusion, or no particular antenna port is specified, the index p may be dropped. Quantities $a_{k,l}^{(p)}$ corresponding to resource elements not used for transmission of a physical channel or a physical signal in a slot may be set to zero. A physical resource block may be defined as $N_{symb}^{DL}$ consecutive OFDM symbols in the time domain and $N_{sc}^{RB}$ consecutive subcarriers in the frequency domain. Exemplary values of $N_{symb}^{DL}$ and $N_{sc}^{RB}$ are given by Table 1. In the illustrated embodiment, a physical resource block in the downlink consists of $N_{symb}^{DL} \times N_{sc}^{RB}$ resource elements, corresponding to one slot in the time domain and 180 kHz in the frequency domain.

TABLE 1

Exemplary resource block parameters.

| Configuration | $N_{sc}^{RB}$ | $N_{symb}^{DL}$ |
|---|---|---|
| Normal cyclic prefix | 12 | 7 |
| Extended cyclic prefix | 12 | 6 |

The relation between the physical resource block number $n_{PRB}$ in the frequency domain and resource elements (k,l) in a slot may be given by the formula:

$$n_{PRB} = \left\lfloor \frac{k}{N_{sc}^{RB}} \right\rfloor$$

Referring back to FIG. 1, communication between the base stations 105 and user equipment 110 can be coordinated by a scheduler. In one embodiment, each of the base stations 105 implements scheduling functionality that can be used to schedule downlink transmissions to the user equipment 110 for itself and for one or more other base stations 105. The scheduling functionality may be implemented at the medium access control (MAC) layer. For example, the base station 105(1) may act as the serving base station for user equipment 110 and may therefore act as the master base station for communication with the user equipment 110. Base stations 105(2-3) may act as slave base stations for coordinated multipoint communication between the base stations 105 and user equipment 110. The base station 105(1) may therefore coordinate operation of the base stations 105 to perform joint transmission by multiple base stations 105 in the same resource elements of one or subframes. The base station 105(1) may also coordinate operation of the base stations 105 to perform dynamic point selection (DPS) so that one dynamically selected base station 105 transmits a symbol in a selected resource element or set of resource elements. The base station 105(1) may dynamically select different base stations 105 for downlink transmission in different resource elements, e.g., based on channel conditions or channel state information. Signaling between the base stations 105 may be carried over an interface such as an X2 interface defined by the LTE standards.

A portion of the resource elements may be reserved for control signaling. In one embodiment, subcarriers associated with one or more symbols may be reserved to transmit control signaling such as the physical downlink control channel (PDCCH), the physical control format indicator channel (PCFICH), or other control channels. For example, the subcarriers associated with the first two symbols in a subframe may be reserved for control channel signaling. The number of symbols that are reserved for control channel signaling may differ for different base stations 105 and the number of symbols that are reserved by a particular base station 105 may change over time. For example, the number of symbols reserved by a base station 105 for control channel signaling may increase in response to increased user arrivals within the corresponding cell 110 and may decrease in response to increased user departures from the corresponding cell 110. In one embodiment, the number of symbols reserved for control signaling may vary between 0 and 3.

Data transmissions may be performed using symbols that have not been reserved for control signaling. The base stations 105 may therefore be configured to signal a starting point, e.g., an index to the first symbol that has not been reserved for control signaling and is available for data transmission, so that the user equipment 115 may be able to determine when to begin monitoring the downlink channels for data transmission. The starting point may be the starting point for coordinated multipoint transmissions such as a joint transmission by multiple base stations 105 using the same resource elements or transmission by one base station 105 that was selected by a master base station 105 using dynamic point selection (DPS). A serving base station 105 that is coordinating operation for joint transmission or DPS transmission may select a starting point for the transmissions to avoid or prevent collisions between scheduled data transmissions and reserved control channels. The serving base station 105 may also choose the starting point to make use of as many symbols as possible.

In one embodiment, the serving base station 105(1) signals a characteristic of a data channel in a subframe using a combination of a first indicator and a second indicator. The characteristic may be the starting time of the data channel in the subframe or the identity of one or more transmission points used for transmitting the data channel. For example, the starting time of the data channel may be indicated in terms of an index of a symbol in the subframe. The first indicator may be transmitted on a first control channel in the same subframe as the data channel. For example, the first indicator may be a bit that is transmitted in the first part of the subframe prior to the starting position of the data channel. In one embodiment, the second indicator may be transmitted on a second control channel in the first part of the subframe prior to the starting position of the data channel. Alternatively, the second indicator may be transmitted using higher layer signaling. Indicators that are transmitted using higher layer signaling may be transmitted less frequently than indicators that are transmitted over the control channels and may remain valid for multiple subframes. As discussed herein, in some embodiments, the data channel may be transmitted from a single transmission point that is dynamically selected, e.g., a new transmission point may be selected subframe-by-subframe from a plurality of transmission points. In other embodiments, the data channel may be transmitted from a plurality of transmission points concurrently or simultaneously. The first control channel of a particular subframe may therefore also convey an indicator of the identity of the transmission points transmitting the data channel in that subframe.

Figure 3:
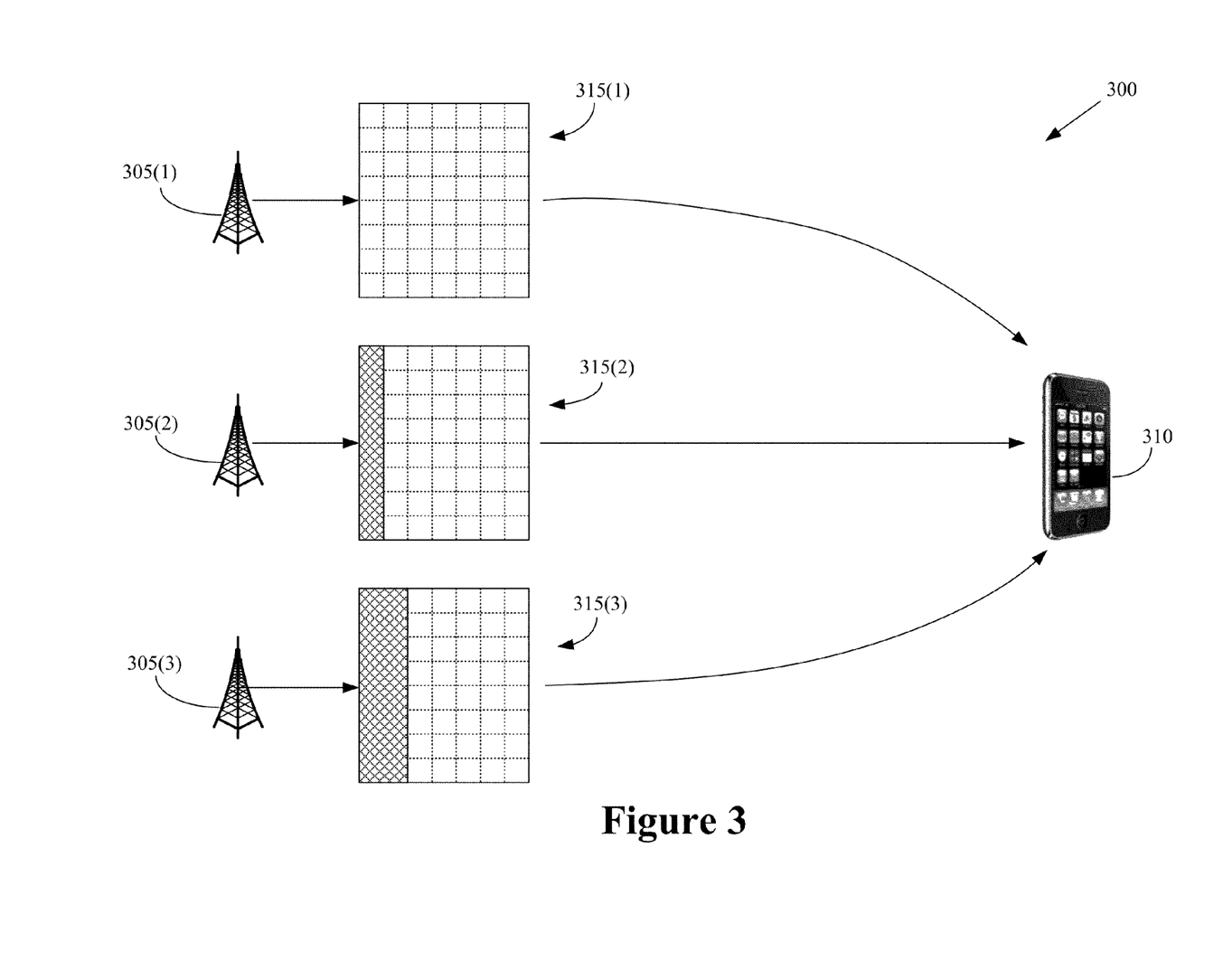
FIG. 3 conceptually illustrates a second exemplary embodiment of a wireless communication system.

FIG. 3 conceptually illustrates a second exemplary embodiment of a wireless communication system 300. In the illustrated embodiment, base stations 305 are configured to provide wireless connectivity to user equipment 310 using OFDM transmissions over the downlink during an exemplary subframe 315. The base station 305(1) has not reserved any symbols in the subframe 315(1) for control signaling. The base station 305(2) has reserved the first symbol of the subframe 315(2) for control signaling and the base station 305(3) has reserved the first two symbols of the subframe 315(3) for control signaling. As discussed herein, the symbols reserved for control signaling by each of the base stations 305 may vary over time.

The starting points for data transmissions may depend on which base stations 305 are scheduled to be transmission points for joint transmission or which base station 305 has been selected as the transmission point for DPS transmission. For example, the entire subframe 315(1) may be used when only the base station 305(1) has been selected for data transmission to the user equipment 310. For another example, only symbols 3-7 may be used for data transmission when the base station 305(3) has been selected for DPS transmission or when the base station 305(3) is one of the base stations 305 participating in joint transmission to the user equipment 310. The base station 305 and the user equipment 310 may therefore be configured to transmit and receive first and second signaling information that is used to inform the user equipment 310 which symbols may be used for data transmission, e.g., during coordinated multipoint transmissions.

Figure 4:
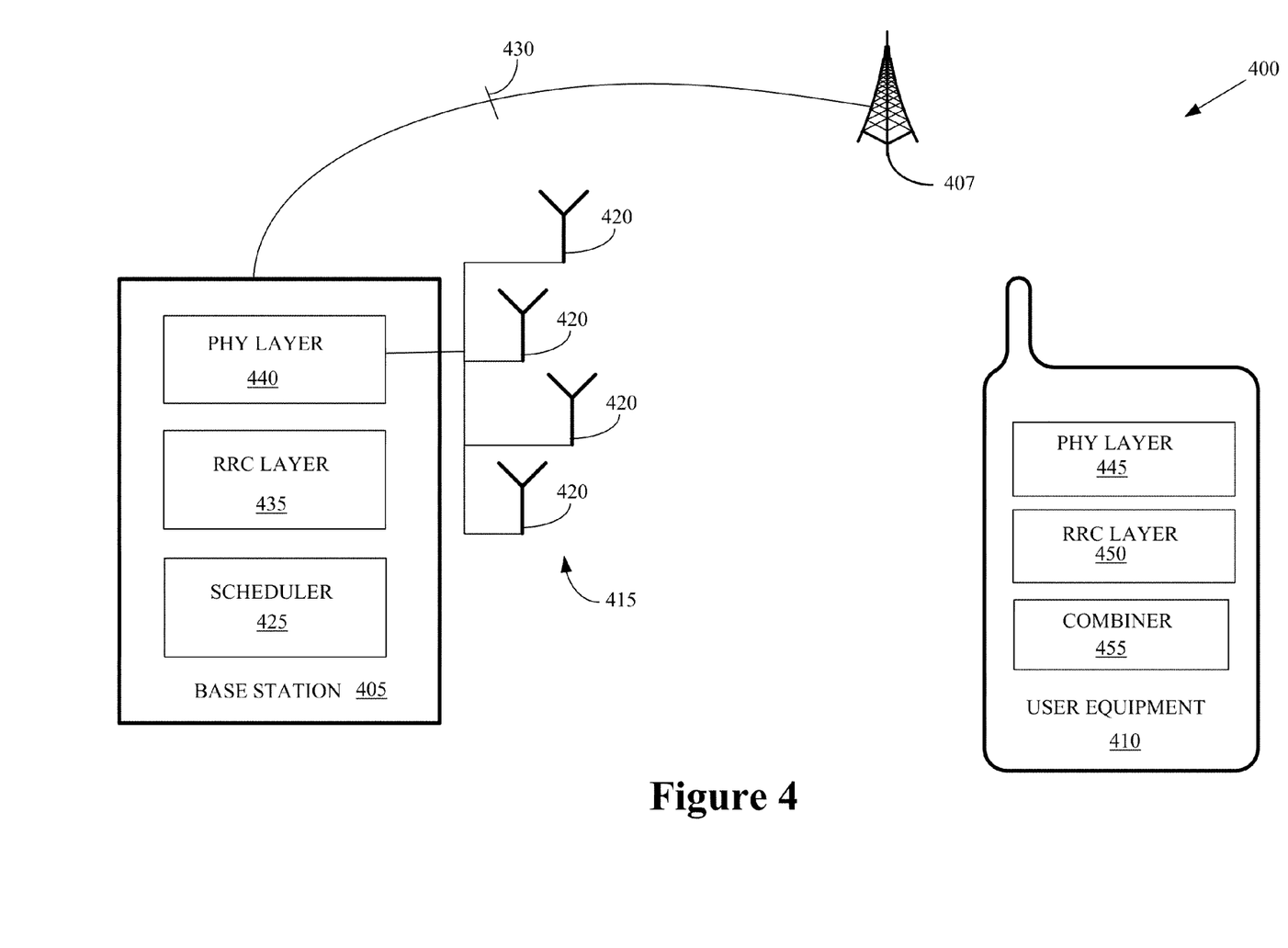
FIG. 4 conceptually illustrates a third exemplary embodiment of a wireless communication system.

FIG. 4 conceptually illustrates a third exemplary embodiment of a wireless communication system 400. In the illustrated embodiment, the wireless communication system 400 includes base stations 405, 407 that operate according to the LTE standards and support OFDM downlink transmission towards user equipment 410. Downlink subframes may include one or more control channels such as the PCFICH or PDCCH and data channels such as the physical downlink shared channel (PDSCH). The base station 405 is the serving base station for user equipment 410 and may therefore coordinate downlink transmissions by the base station 405 and the slave base station 407, as well as other base stations that may be participating in coordinated multipoint transmissions. In the illustrated embodiment, a serving base station may be defined from the perspective of user equipment 410 as a base station from which the user equipment 410 may receive and decode control channels such as the PCFICH and PDCCH. However, alternative embodiments of the wireless communication system 400 may define or identify the serving base station using different criteria.

The base station 405 is physically, electromagnetically, or communicatively coupled to an antenna array 415 that includes a plurality of antenna elements 420. The antenna array 415 may be used for transmitting downlink signals and receiving uplink signals. The base station 405 also includes a scheduler 425 for scheduling downlink transmissions to the user equipment 410. In the illustrated embodiment, the base station 405 may communicate with other base stations such as the neighboring base station 407 over an interface 430. For example, the interface 430 may be an X2 interface defined by the LTE standards. The scheduler 425 may use information exchanged over the interface 430 to support scheduling coordinated multipoint transmissions, as discussed herein. Other functionality of the base station 405 may be implemented in layers, e.g., according to the Open Systems Interconnection (OSI) model. In the illustrated embodiment, the base station 405 includes a radio resource control layer 435 that may include functionality for supporting transmission of data sequences from a source to a destination and a physical layer 440 that provides the means for transmitting or receiving bits over the air interface. The base station 405 may also include functionality to support other layers but in the interest of clarity these layers are not depicted in FIG. 4. Persons of ordinary skill in the art having benefit of the present disclosure should appreciate that the functionality of the base station 405 may be implemented as hardware, firmware, software, or combinations thereof.

User equipment 410 includes functionality that may be implemented in terms of layers such as the OSI layers. In the illustrated embodiment, user equipment 410 includes a physical layer 445 that provides means for transmitting or receiving bits over the air interface, an RRC layer 450 for supporting transmission of data sequences, and other layers that are not depicted in FIG. 4 in the interest of clarity. User equipment 410 may also include a combiner 455 that is used to combine different sets of information received from the base station 405 to determine starting points (or transmission points) for data transmission during coordinated multipoint downlink transmissions, as discussed herein. Persons of ordinary skill in the art having benefit of the present disclosure should appreciate that the functionality of user equipment 410 may be implemented as hardware, firmware, software, or combinations thereof.

The scheduler 415 may schedule transmission over data channels of the serving base station 405 beginning with the first symbol following the symbols that are reserved for the control channels. User equipment 410 may be informed of the reserved control channels and thus the starting point of the data channels, e.g., using information transmitted by the serving base station 405 over the PCFICH. However, the scheduler 415 in the serving base station 405 may also be responsible for scheduling downlink transmissions from other base stations 407 during coordinated multipoint transmission. The starting point for the data transmissions of the other base stations 407 may differ from the starting point indicated in the PCFICH transmitted by the serving base station 405. For example, if only the neighbor base station 407 provides the downlink data transmission (as in the case of DPS) or if more than one base station concurrently provides the downlink transmission (in the case of JT), the starting position of the PDSCH may be different from the PDSCH starting position of the serving base station 405. In the case of JT, the starting position would be after the end of the longest PDCCH of any of the base stations participating in the joint transmission. In some embodiments, the base station that is transmitting the PDSCH in DPS or the base stations in JT that are concurrently transmitting PDSCH might not include the serving base station 405.

The serving base station 405 is configured to transmit signals that indicate starting points for data transmissions, such as data transmissions during coordinated multipoint operation. In some embodiments, the serving base station 405 may also be configured to transmit information indicating the identities of the base stations that act as the transmission points during coordinated multipoint transmission. The information that indicates the starting point for data transmissions may be separated into two different sets of information. In one embodiment, the serving base station 405 transmits first information indicating a first constraint on a starting position for data transmission by the serving base station 405, other base stations 407, or combinations thereof. The serving base station 405 also transmits a bit that can be used in combination with the first information to indicate the starting position for data transmission. For example, the combiner 455 in the user equipment 410 may be configured to determine the starting position for the data transmission using a logical combination of the value of the bit and the first information.

Embodiments of these signaling techniques may therefore enable the base station 405 to dynamically signal a data transmission starting point such as the PDSCH starting position in order to make as many transmission resources as possible available for the data channel in each subframe while also allowing for the constraints imposed by the different sizes of the control signaling region at the start of each subframe in the different cells that may be selected for the PDSCH transmission. Signaling all possible starting positions for the PDSCH using the PDCCH (or ePDCCH) would result in excessive signaling overhead, e.g., 2 bits per transmission point would be needed to indicate all possible start positions (symbols 1-3 in LTE embodiments) for all transmission points. Embodiments of the techniques described herein may reduce the signaling overhead by exploiting other means for signaling the starting points. For example, the existing PCFICH (which may be transmitted by the physical layer 440 and which indicates the starting position of the PDSCH transmitted by the serving base station 405) may be used to indicate a constrained number of possible starting positions. For another example, the RRC layer 435 may provide RRC signaling (which is not updated as frequently as the PCFICH) to indicate the constrained number of possible starting positions for the PDSCH. In one embodiment, one signaling bit can be added to the Downlink Control Information (DCI) on the PDCCH. The value of this signaling bit can be used to select the PDSCH starting position from among the constrained number of possible starting positions indicated by the other information.

In one embodiment, the starting time of the data channel is the index of the OFDM symbol in which the data channel starts, the data channel is a PDSCH, and first information indicating the starting time is conveyed over a first control channel that may be a PDCCH transmitted in the first OFDM symbols of the subframe prior to the starting position of the PDSCH or an ePDCCH transmitted in the same subframe as the PDSCH. In embodiments in which the second starting position indicator is transmitted on a second control channel in the first part of the subframe prior to the starting position of the data channel, the second control channel may be the PCFICH. For example, the PCFICH may indicate a starting position for the data channel PDSCH as one of the OFDM symbols numbers 1, 2 or 3 in the subframe, where the index of OFDM symbol starts from zero in this example. The symbol number indicates the starting position of the PDSCH for transmissions performed from the serving base station 405. In embodiments in which the second indicator is signaled by higher layer signaling, the RRC layer 435 may generate and transmit the second control information using RRC signaling.

In a first exemplary embodiment, RRC signaling provided by the RRC layer 435 is used to configure two possible PDSCH starting positions for CoMP by taking into account scheduling decisions in the base stations that are participating in the coordinated downlink transmissions. The RRC signaling indicates two candidate starting positions to user equipment 410 and the additional information comprising 1-bit of DCI information can be dynamically signaled to user equipment 410 to indicate the PDSCH starting position. One example is given in Table 1:

TABLE 1

| Set of values indicated by RRC signalling $\{d\_0, d\_1\}$ | PDSCH starting position in serving cell indicated by PCFICH | Meaning of first value of the new DCI bit on the PDSCH Starting Position | Meaning of second value of the new DCI bit on the PDSCH Starting Position |
|---|---|---|---|
| $\{d\_0, d\_1\} = \{1, 2\}$ | 1 | 1 | 2 |
|  | 2 | 2 | 2 |
|  | 3 | 3 | 3 |
| $\{d\_0, d\_1\} = \{1, 3\}$ | 1 | 1 | 3 |
|  | 2 | 2 | 3 |
|  | 3 | 3 | 3 |
| $\{d\_0, d\_1\} = \{2, 3\}$ | 1 | 2 | 3 |
|  | 2 | 2 | 3 |
|  | 3 | 3 | 3 |

In the first exemplary embodiment depicted in Table 1, the values of d_0 and d_1 are indicated by RRC signaling semi-statically, e.g. on timescales of approximately 10-20 ms. User equipment 410 receives the DCI bit at the physical layer 445 and the RRC signaling the RRC layer 450. The two pieces of information can then be combined by the combiner 455 to determine the starting position. For example, the PDSCH starting position can be represented by the logical expression: max(d_0, PCFICH) or max(d_1, PDFICH), where the operation of max gives the maximal value of numerical set. In the first exemplary embodiment, the available PDSCH resource elements are constrained so that the PDSCH region for CoMP should not conflict with the PDCCH region of the serving base station 405. This constraint is indicated to user equipment 410 by the RRC signaling.

In a second exemplary embodiment depicted in Table 2, RRC signaling is used to configure two possible PDSCH starting positions by taking into account scheduling decisions in base stations in the same way as in the first exemplary embodiment, except that in the second exemplary embodiment the PDSCH starting position may be independent of the value indicated by the PCFICH, as shown in Table 2:

TABLE 2

| Set of values indicated by RRC signalling {d_0, d_1} | PDSCH starting position in serving cell indicated by PCFICH | Meaning of first value of the new DCI bit on the PDSCH Starting Position | Meaning of second value of the new DCI bit on the PDSCH Starting Position |
|---|---|---|---|
| {d_0, d_1} = {1, 2} | 1 | 1 | 2 |
|  | 2 | 1 | 2 |
|  | 3 | 1 | 2 |
| {d_0, d_1} = {1, 3} | 1 | 1 | 3 |
|  | 2 | 1 | 3 |
|  | 3 | 1 | 3 |
| {d_0, d_1} = {2, 3} | 1 | 2 | 3 |
|  | 2 | 2 | 3 |
|  | 3 | 2 | 3 |

Depending on the value of new DCI bit, the PDSCH starting position indicated in the second exemplary embodiment can be either d_0 or d_1 and may be independent of the value of PCFICH. In the second exemplary embodiment, the available PDSCH resource elements may be constrained so that the PDSCH starting position occurs after the end of the longest PDCCH of any of the base stations participating in the CoMP transmission.

The second exemplary embodiment may be implemented in cases when the PDSCH is not transmitted from the transmission point transmitting the PCFICH and PDCCH. For example, the indicated resource allocation for the PDCCH might conflict with the PDCCH region of the serving base station 405 if the value of PCFICH indicated by the serving base station 405 is 3, but the value of new DCI bit is 0, and the value d_0 signaled by the RRC layer 435 is 1. In that case, PDSCH starting position for the coordinated multipoint downlink transmission collides with the PDCCH region of the serving base station 405 at the OFDM symbols 2 and 3. Coordinated multipoint transmissions using either JT or DPS may still be feasible as long as the downlink transmission does not involve the serving base station 405. From the perspective of the user equipment 410, the control channel(s) and data channel(s) are spatially multiplexed during a joint transmission from the serving base station 405 and other base stations such as the base station 407 that may be participating in the coordinated transmission. In one embodiment, user equipment 410 may use interference cancellation techniques, such as successive interference cancellation, to enable both the PDCCH of the base station 405 and the PDSCH from the other transmission points to be decoded.

In a third exemplary embodiment, RRC signaling is used to configure one possible PDSCH starting position by taking into account scheduling decision made by the scheduler 425. The RRC layer 435 can convey the information indicating the possible starting position to user equipment 410. The physical layer 440 can then transmit the 1-bit DCI information for the user equipment 410 to indicate PDSCH starting position. In the third exemplary embodiment, the value of the bit indicates the PDSCH by selecting either the value of PCFICH or the value indicated by the RRC signaling. An example is given in Table 3:

TABLE 3

| Set of values indicated by RRC signalling {d_0} | PDSCH starting position in serving cell indicated by PCFICH | Meaning of first value of the new DCI bit on the PDSCH Starting Position | Meaning of second value of the new DCI bit on the PDSCH Starting Position |
|---|---|---|---|
| {d_0} = {1} | 1 | 1 | 1 |
|  | 2 | 2 | 1 |
|  | 3 | 3 | 1 |
| {d_0} = {2} | 1 | 1 | 2 |
|  | 2 | 2 | 2 |
|  | 3 | 3 | 2 |
| {d_0} = {3} | 1 | 1 | 3 |
|  | 2 | 2 | 3 |
|  | 3 | 3 | 3 |

Depending on the value of new DCI bit, the starting position of PDSCH during coordinated downlink transmissions can be either the value of PCFICH or the value of d_0 indicated by the RRC signaling. The available PDSCH resource elements involved in the coordinated transmission are therefore constrained to the value of PCFICH or the value of d_0. If the first value of the DCI bit is indicated, then the PDSCH starting position is the value of PCFICH and should not conflict with PDCCH region from the serving base station 405. If the second value of new DCI bit is indicated, then the PDSCH starting position is the value of d_0 and should not conflict with the longest PDCCH of any of the base stations participating in the coordinated PDSCH transmission, which may or may not involve the serving base station 405.

In one embodiment, the serving base station 405 may also transmit information indicating the identities of the data channel transmission points during coordinated multipoint downlink transmissions. For example, the scheduler 425 may select a set of transmission points for downlink transmission during one or more subframes. The transmission points may include base stations with respective base station identifiers, transmission points within a cell with respective identifiers that correspond to the transmission points, transmission points that are identified by associated reference signals such as associated CSI-RS resource configurations, or other types of transmission points. The set of possible transmission points may be conveyed to user equipment 410, e.g., using signaling provided by the RRC layer 435. The physical layer 440 may transmit second information such as a small number of bits in the DCI to indicate which transmission point(s) from the set of possible transmission points are to be used for the transmission of the PDSCH. In one embodiment, the information indicating the transmission points may also provide the user equipment 410 with information about parameters such as the scrambling used for the data transmission and the Common Reference Signal (CRS) configuration.

For example, if transmission points A, B and C are indicated by RRC signaling, then 3 bits in the DCI could indicate which of the transmission points were actually used for coordinated transmission during an associated subframe. Alternatively, a smaller number of bits could be provided in the DCI if the RRC signaling includes an indication of the number of transmission points that may be used for the downlink transmission. For example, 2 bits in the DCI would be sufficient to indicate which of the 4 pre-configured transmission points was used if the RRC signaling indicates that only 1 transmission point would be used (e.g., DPS). For another example, if the RRC signaling indicates that 2 points would be used, or that 2 or 3 points would be used, or that 2 points or a serving point (e.g. point A) would be used, then 2 bits in the DCI would be sufficient to indicate the actual combination (e.g. {(A,B); (A,C); (B,C)}, or {(A,B); (A,C); (B,C), (A,B,C)}, or {(A,B); (A,C); (B,C), (A)}).

Figure 5:
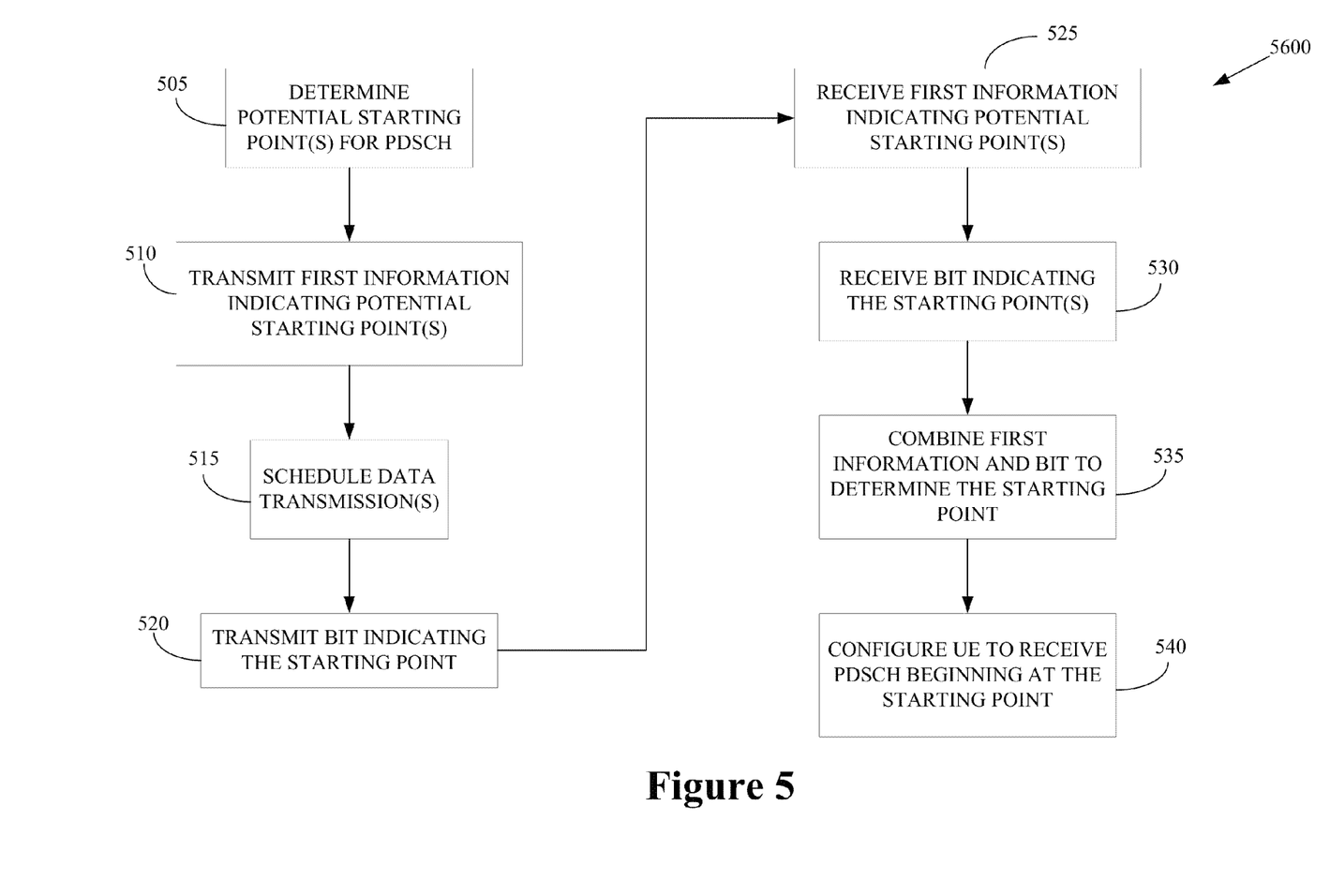
FIG. 5 conceptually illustrates one exemplary embodiment of a method for supporting coordinated multipoint downlink transmissions between one or more base stations and user equipment.

FIG. 5 conceptually illustrates one exemplary embodiment of a method 500 for supporting coordinated multipoint downlink transmissions between one or more base stations and user equipment. In the illustrated embodiment, a set of potential starting points are determined (at 505) for downlink data channel such as the PDSCH. A scheduler in the serving base station may determine (at 505) the potential starting points using information indicating the symbols reserved for control channels by the serving base station and one or more neighboring base stations that may also be participating in the coordinated transmission. The symbol reservation information may be exchanged over interfaces between the base stations, as discussed herein. The serving base station may then transmit (at 510) first information indicating the potential starting points. In one embodiment, the first information may be transmitted (at 510) over a control channel using symbols in a subframe prior to the data transmissions. Alternatively, RRC signaling may be used to transmit (at 510) information indicating the potential starting points.

Data transmissions may then be scheduled (at 515) and information indicating the starting point for the data transmissions may be transmitted (at 520) towards the user equipment. In one embodiment, a bit generated in a physical layer of the serving base station may be transmitted (at 520) to indicate which of the potential starting points is the starting point for the scheduled data transmissions. Persons of ordinary skill in the art having benefit of the present disclosure should appreciate that the particular sequence of steps (505, 510, 515, 520) is intended to be illustrative. In alternative embodiments, the steps (505, 510, 515, 520) may be performed in other orders or some of the steps may be performed concurrently.

User equipment receives (at 525) the first information indicating the potential starting point for the data transmission using either physical layer or RRC layer functionality, depending on how this information was transmitted by the serving base station. User equipment also receives (at 530) the bit indicating the actual starting point for the scheduled data transmissions. Persons of ordinary skill in the art having benefit of the present disclosure should appreciate that the particular sequence of steps (525 and 530) is intended to be illustrative. In alternative embodiments, the steps (525 and 530) may be performed in other orders or they may be performed concurrently. User equipment combines (at 535) the bit with the first information indicating the potential starting points to determine the actual starting point for the scheduled data transmission. The user equipment can then be configured (at 540) to receive the data transmission beginning at the determined starting point, e.g., by receiving the data transmission over the PDSCH.

Figure 6:
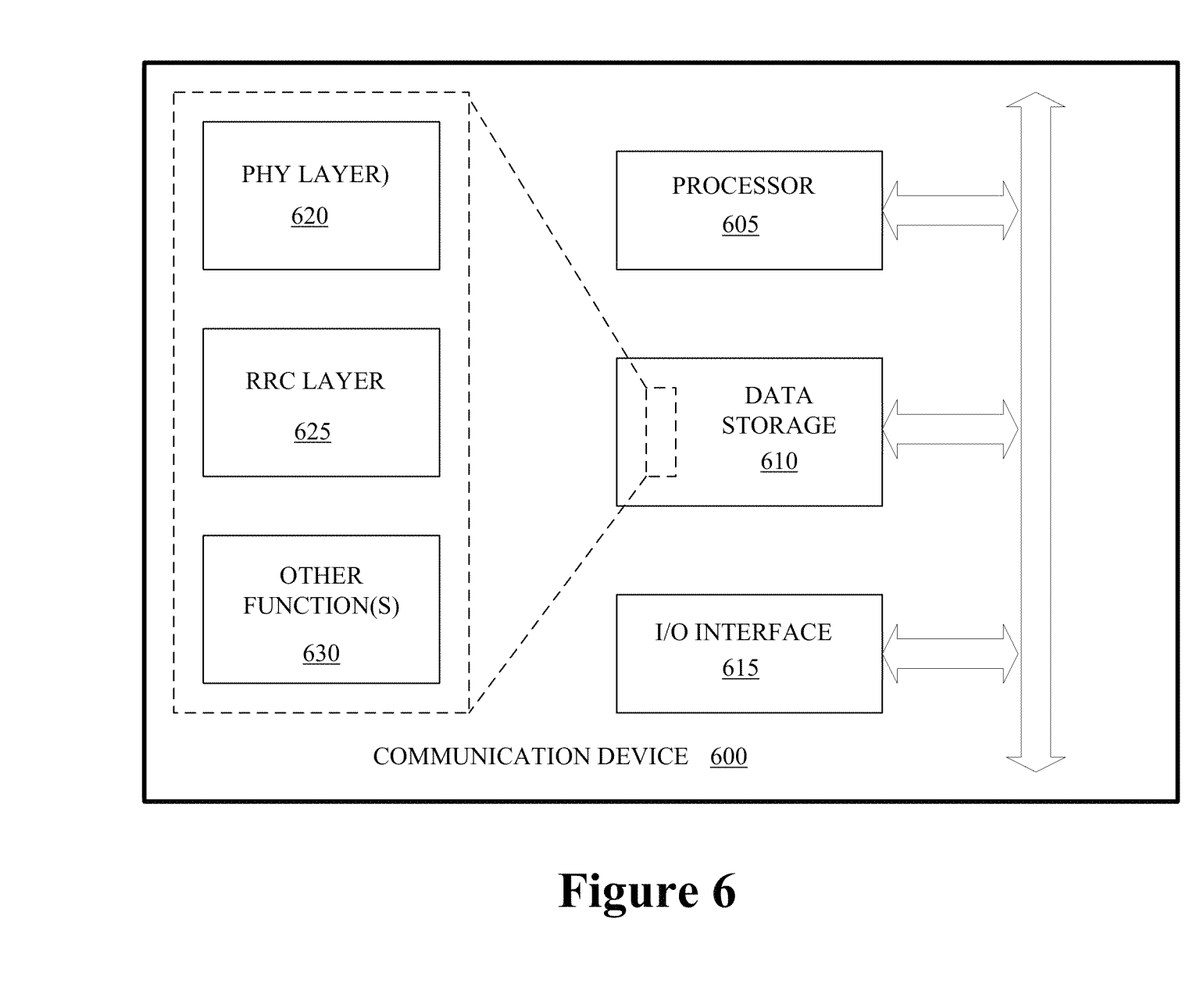
FIG. 6 conceptually illustrates one exemplary embodiment of a communication device.

FIG. 6 conceptually illustrates one exemplary embodiment of a communication device 600 that may be used to implement physical layer functionality, RRC layer functionality, or other functionality for supporting coordinated downlink multipoint transmission. In the illustrated embodiment, the communication device 600 includes a processor 605, data storage 610, and an input/output (I/O) interface 615. The processor 605 is configured to control operation of the communication device 600, e.g., using data or instructions stored in the data storage 610 or at other locations. In different embodiments, the communication device 600 may be a portion of the base station or user equipment. Embodiments of the operations that may be performed by the communication device 600 are described herein in conjunction with FIGS. 1-5. In one embodiment, the data storage 610 stores information 620 that represents physical layer functionality, information 625 that represents RRC layer functionality, or information 630 that represents other functionality such as scheduler functionality or combining functionality. When processor-executable programs are implemented on the processor 605, the program code segments combine with the processor 605 to provide a unique device that operates analogously to specific logic circuits.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
   transmitting, from a first base station, first information indicating a plurality of potential starting points for downlink data transmission by at least one of the first base station or at least one second base station, wherein the first information is transmitted at a first time;

transmitting, from the first base station, second information comprising at least one bit, wherein the second information is transmitted at a second time, and wherein a combination of the at least one bit and the first information indicate a starting position for the downlink data transmission from the plurality of potential starting points; and transmitting, from the first base station, at least one other bit and radio resource control (RRC) layer information that indicates a plurality of transmission points, wherein at least one transmission point that is to transmit the downlink data transmission is indicated by a combination of the RRC layer information and said at least one other bit.

2. The method of claim 1, wherein transmitting the first information comprises transmitting RRC layer information indicating the plurality of potential starting points for the downlink data transmission.

3. The method of claim 2, wherein transmitting the second information comprises transmitting the second information on a shorter timescale than the RRC layer information.

4. The method of claim 2, wherein transmitting the RRC layer information comprises transmitting RRC layer information indicating first and second potential starting points for the downlink data transmission, and wherein the value of the at least one bit indicates whether the first potential starting point or the second potential starting point is the starting symbol for the downlink data transmission.

5. The method of claim 1, wherein transmitting the second information comprises transmitting the second information on a control channel prior to the starting point for the downlink data transmission.

6. The method of claim 5, wherein transmitting the second information comprises transmitting the second information on the control channel in the same subframe as the starting point for the downlink data transmission.

7. The method of claim 1, comprising generating the first information or the second information based on information received from at least one neighboring base station in a set of base stations that are cooperating during coordinated multi-point transmission.

8. The method of claim 1, wherein transmitting the RRC layer information comprises transmitting a plurality of bits that identify said at least one transmission point for the downlink data transmission.

9. A method, comprising:

transmitting, from a first base station, first information comprising radio resource control (RRC) layer information indicating a plurality of potential starting points for downlink data transmission by at least one of the first base station or at least one second base station;

transmitting, from the first base station, second information comprising at least one bit, wherein the second information is transmitted at a second time, and wherein a combination of the at least one bit and the first information indicate a starting position for the downlink data transmission from the plurality of potential starting points;

transmitting a control format indicator channel that indicates a first potential starting point determined by control channel reservations at the first base station, and wherein transmitting the RRC layer information comprises transmitting RRC layer information indicating a second potential starting point for the downlink data transmission, and wherein the value of the at least one bit indicates whether the first potential starting point or the second potential starting point is the starting point for the downlink data transmission; and transmitting, from the first base station, at least one other bit and RRC layer information that indicates a plurality of transmission points, and wherein at least one transmission point that is to transmit the downlink data transmission is indicated by a combination of the RRC layer information and said at least one other bit.

10. A base station configurable to:

transmit first information indicating a plurality of potential starting points for downlink data transmission by at least one of the base station or at least one second base station, wherein the first information is transmitted at a first time;

transmit second information comprising at least one bit, wherein the second information is transmitted at a second time, wherein a combination of the at least one bit and the first information indicate a starting point for the downlink data transmission from the plurality of potential starting points; and transmit at least one other bit and radio resource control (RRC) layer information that indicates a plurality of transmission points, and wherein at least one transmission point that is to transmit the downlink data transmission is indicated by a combination of the RRC layer information and said at least one other bit.

11. The base station of claim 10, wherein the base station is configurable to transmit RRC layer information indicating the plurality of potential starting points for the downlink data transmission.

12. The base station of claim 11, wherein the base station is configurable to transmit RRC layer information indicating first and second potential starting points for the downlink data transmission, and wherein the value of the at least one bit indicates whether the first potential starting point or the second potential starting point is the starting point for the downlink data transmission.

13. The base station of claim 10, wherein the base station is configurable to transmit the second information on a control channel prior to the starting point for the downlink data transmission.

14. The base station of claim 13, wherein the base station is configurable to transmit the second information on the control channel in the same subframe as the starting point for the downlink data transmission.

15. The base station of claim 10, wherein the base station is configurable to transmit a plurality of bits that identify said at least one transmission point for the downlink data transmission.

16. A base station configurable to:

transmit first information indicating a plurality of potential starting points for downlink data transmission by at least one of the base station or at least one second base station, wherein the first information is transmitted at a first time;

transmit second information comprising at least one bit, wherein the second information is transmitted at a second time, wherein a combination of the at least one bit and the first information indicate a starting point for the downlink data transmission from the plurality of potential starting points;

transmit a control format indicator channel that indicates a first potential starting point determined by control channel reservations at the base station, and wherein the base station is configurable to transmit RRC layer information indicating a second potential starting point for the downlink data transmission, wherein the value of the at least one bit indicates whether the first potential starting point or the second potential starting point is the starting point for the downlink data transmission; and transmit at least one other bit and RRC layer information that indicates a plurality of transmission points, and wherein at least one transmission point that is to transmit the downlink data transmission is indicated by a combination of the RRC layer information and said at least one other bit.

17. User equipment configurable to:

receive first information indicating a plurality of starting points for downlink data transmission by at least one base station, wherein the first information is received at a first time;

receive second information comprising at least one bit, wherein the second information is received at a second time;

receive third information indicating at least one transmission point for the downlink data transmission;

combine the at least one bit and the first information to determine a starting point for the downlink data transmission from the plurality of starting points;

receive RRC layer information that indicates a plurality of transmission points;

receive at least one other bit; and combine the RRC layer information and said at least one other bit to determine at least one transmission point for the downlink data transmission.

18. The user equipment of claim 17, wherein the user equipment is configurable to receive RRC layer information indicating first and second potential starting points for the downlink data transmission, and wherein the value of the at least one bit indicates whether the first potential starting point or the second potential starting point is the starting point for the downlink data transmission.

19. The user equipment of claim 17, wherein the user equipment is configurable to receive the second information on a control channel prior to the starting point for the downlink data transmission.

20. The user equipment of claim 19, wherein the user equipment is configurable to receive the second information on the control channel in the same subframe as the starting point for the downlink data transmission.

21. The user equipment of claim 17, wherein the user equipment is configurable to receive a plurality of other bits that identify said at least one transmission point for the downlink data transmission.

22. User equipment configurable to:

receive first information indicating a plurality of starting points for downlink data transmission by at least one base station, wherein the first information is received at a first time;

receive second information comprising at least one bit, wherein the second information is received at a second time;

combine the at least one bit and the first information to determine a starting point for the downlink data transmission from the plurality of starting points;

receive a control format indicator channel that indicates a first potential starting point determined by control channel reservations at the at least one base station, and wherein the user equipment is configurable to receive RRC layer information indicating a second potential starting point for the downlink data transmission, wherein the value of the at least one bit indicates whether the first potential starting point or the second potential starting point is the starting point for the downlink data transmission;

receive RRC layer information that indicates a plurality of transmission points;

receive at least one other bit; and combine the RRC layer information and said at least one other bit to determine at least one transmission point for the downlink data transmission.

* * * * *